(12) United States Patent
Namboodiri et al.

(10) Patent No.: US 9,706,485 B2
(45) Date of Patent: Jul. 11, 2017

(54) CONDUCTING PUBLIC LAND MOBILE NETWORK (PLMN) SEARCHES IN A MULTI-RADIO ACCESS TECHNOLOGY (RAT) ENVIRONMENT

(71) Applicant: QUALCOMM Incorporated, San Diego, CA (US)

(72) Inventors: Vishnu Namboodiri Karakkad Kesavan Namboodiri, Kannur Kerala (IN); Mukesh Kumar, Hyderabad (IN); Suresh Sanka, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/870,469

(22) Filed: Sep. 30, 2015

(65) Prior Publication Data
US 2017/0094591 A1   Mar. 30, 2017

(51) Int. Cl.
*H04W 4/00* (2009.01)
*H04W 48/16* (2009.01)
*H04B 17/318* (2015.01)
*H04L 12/26* (2006.01)
*H04W 36/00* (2009.01)
*H04W 84/04* (2009.01)

(52) U.S. Cl.
CPC .......... *H04W 48/16* (2013.01); *H04B 17/318* (2015.01); *H04L 43/16* (2013.01); *H04W 36/0061* (2013.01); *H04W 36/0072* (2013.01); *H04W 84/042* (2013.01)

(58) Field of Classification Search
CPC ............. H04W 48/16; H04W 36/0061; H04W 36/0072; H04W 84/042; H04B 17/218; H04L 43/16

USPC ................ 455/434, 432.1, 433, 435.2, 456.1
See application file for complete search history.

(56) References Cited

U.S. PATENT DOCUMENTS

| | | |
|---|---|---|
| 8,200,177 B2 | 6/2012 | Lee et al. |
| 8,897,224 B2 | 11/2014 | Ben-Eli |
| 8,923,858 B2 | 12/2014 | Perets et al. |
| 2004/0224689 A1 | 11/2004 | Raghuram et al. |
| 2007/0211669 A1* | 9/2007 | Umatt .................. H04W 48/18 370/335 |
| 2008/0153486 A1 | 6/2008 | Ramkull et al. |

(Continued)

OTHER PUBLICATIONS

International Search Report and Written Opinion—PCT/US2016/052625—ISA/EPO—Nov. 25, 2016.

*Primary Examiner* — Khai M Nguyen
(74) *Attorney, Agent, or Firm* — Larry J. Moskowitz

(57) ABSTRACT

Various embodiments for conducting a public land mobile network (PLMN) search for a plurality of radio access technologies (RATs) on a mobile communication device may include profiling a frequency space to identify one or more frequency bands that may be utilized by one of the plurality of RATs and determining, according to a priority ordering of the plurality of RATs, a RAT that utilizes each identified frequency band. The mobile communication device may add, for each RAT in the plurality of RATs, the identified frequency bands utilized by each RAT to exclude lists associated with other RATs in the plurality of RATs. The mobile communication device may then conduct a PLMN search for each RAT in the plurality of RATs utilizing the exclude lists associated with each RAT.

27 Claims, 14 Drawing Sheets

(56) References Cited

U.S. PATENT DOCUMENTS

| | | | | |
|---|---|---|---|---|
| 2010/0081433 A1* | 4/2010 | Lee | ............... | H04W 48/18 |
| | | | | 455/434 |
| 2012/0264425 A1* | 10/2012 | Krishnamoorthy | ... | H04W 48/16 |
| | | | | 455/434 |
| 2013/0039181 A1* | 2/2013 | Chao | ............... | H04W 48/16 |
| | | | | 370/235 |
| 2013/0121218 A1* | 5/2013 | Lu | ............... | H04W 60/00 |
| | | | | 370/281 |
| 2013/0130678 A1* | 5/2013 | Zanier | ............... | H04W 8/065 |
| | | | | 455/433 |
| 2013/0343223 A1* | 12/2013 | Martin | ............... | H04W 24/10 |
| | | | | 370/252 |
| 2014/0256316 A1* | 9/2014 | Lee | ............... | H04W 48/16 |
| | | | | 455/434 |
| 2015/0056985 A1 | 2/2015 | Swaminathan et al. | | |
| 2016/0157161 A1* | 6/2016 | Miao | ............... | H04W 64/00 |
| | | | | 455/434 |

* cited by examiner

CONDUCTING PUBLIC LAND MOBILE NETWORK (PLMN) SEARCHES IN A MULTI-RADIO ACCESS TECHNOLOGY (RAT) ENVIRONMENT

BACKGROUND

Some designs of mobile communication devices—such as smart phones, tablet computers, and laptop computers—contain one or more Subscriber Identity Module (SIM) cards that provide users with access to multiple separate mobile telephony networks. Examples of mobile telephony networks include Third Generation (3G), Fourth Generation (4G), Long Term Evolution (LTE), Time Division Multiple Access (TDMA), Code Division Multiple Access (CDMA), Wideband CDMA (WCDMA), Global System for Mobile Communications (GSM), and Universal Mobile Telecommunications Systems (UMTS).

A public land mobile network (PLMN) is a mobile telephony network controlled by a specific network operator. A PLMN may be defined by a unique combination of a mobile country code and a mobile network code that is assigned to the network operator. Each SIM on the mobile communication device may support a subscription that is used to register with and communicate over a PLMN using a corresponding radio access technology (RAT). For example, a subscription may use a LTE RAT to communicate with a PLMN that supports LTE communication. A mobile communication device may include multiple SIMs (a multi-SIM communication device), and each SIM may utilize one or more RATs to communicate with its respective network.

Before a mobile communication device can acquire service through a mobile telephony network, the mobile communication device conducts a PLMN search. The PLMN search includes scanning the entire communications frequency space for network signals. If the mobile communication device is capable of utilizing multiple RATs (e.g., a multi-SIM mobile communication device), the PLMN search is conducted for each RAT that the mobile communication device is capable of utilizing. For example, if a mobile communication device can communicate through GSM, WCDMA, and LTE RATs, the mobile communication device conducts separate PLMN searches for GSM signals, WCDMA signals, and LTE signals.

SUMMARY

Various embodiments include methods implemented on a mobile communication device for conducting a public land mobile network (PLMN) search for a plurality of radio access technologies (RATs) on a mobile communication device. Various embodiments may include profiling a frequency space to identify one or more frequency bands that may be utilized by one of the plurality of RATs, determining, according to a priority ordering of the plurality of RATs, a RAT that utilizes each identified frequency band, adding, for each RAT in the plurality of RATs, the identified frequency bands utilized by each RAT to exclude lists associated with other RATs in the plurality of RATs, and conducting a PLMN search for each RAT in the plurality of RATs utilizing the exclude lists associated with each RAT.

In some embodiments, profiling the frequency space may include obtaining, for a plurality of narrow frequency bands in the frequency space, received signal strength values, and identifying the one or more frequency bands, in which each identified frequency band includes a plurality of consecutive narrow frequency bands with received signal strength values above a threshold. In some embodiments, each narrow frequency band may span 1 MHz.

In some embodiments, determining, according to the priority ordering of the plurality of RATs, a RAT that utilizes each identified frequency band may include selecting a RAT in the plurality of RATs according to the priority ordering, and verifying whether each of the identified frequency bands carry a signal for the selected RAT. In some embodiments, the priority ordering may be based on a size of a frequency bandwidth of each RAT in the plurality of RATs. In some embodiments, the priority ordering may order the plurality of RATs from largest frequency bandwidth to smallest frequency bandwidth.

Some embodiments may further include adding information from neighbor cell lists to the exclude lists associated with each RAT in the plurality of RATs. In some embodiments, adding information from neighbor cell lists to the exclude lists associated with each RAT in the plurality of RATs may include determining whether the mobile communication device is camped on a first RAT in the plurality of RATs, obtaining a neighbor cell list for the first RAT in response to determining that the mobile communication device is camped on the first RAT, checking the validity of each neighbor cell in the neighbor cell list, and adding each valid neighbor cell in the neighbor cell list to the exclude lists associated with each RAT in the plurality of RATs, excluding the first RAT.

In some embodiments, conducting the PLMN search for each RAT in the plurality of RATs utilizing the exclude lists associated with each RAT may include selecting a first RAT from the plurality of RATs, conducting the PLMN search for the first RAT, in which the PLMN search excludes frequencies listed in the exclude list associated with the first RAT, and updating the exclude lists of each RAT in the plurality of RATs, excluding the first RAT, based on the PLMN search for the first RAT. In some embodiments, updating the exclude lists of each RAT in the plurality of RATs, excluding the first RAT, based on the PLMN search for the first RAT may include identifying a first frequency band utilized by the first RAT during the PLMN search, and adding the first frequency band to the exclude lists of each RAT in the plurality of RATs, excluding the first RAT.

Further embodiments include a mobile communication device including a memory and a processor configured with processor-executable instructions to perform operations of the methods described above. Further embodiments include a non-transitory processor-readable storage medium having stored thereon processor-executable software instructions configured to cause a processor of a mobile communication device to perform operations of the methods described above. Further embodiments include a mobile communication device that includes means for performing functions of the operations of the methods described above.

BRIEF DESCRIPTION OF THE DRAWINGS

The accompanying drawings, which are incorporated herein and constitute part of this specification, illustrate exemplary embodiments, and together with the general description and the detailed description given herein, serve to explain the features of the disclosed systems and methods.

DETAILED DESCRIPTION

Figure 1:
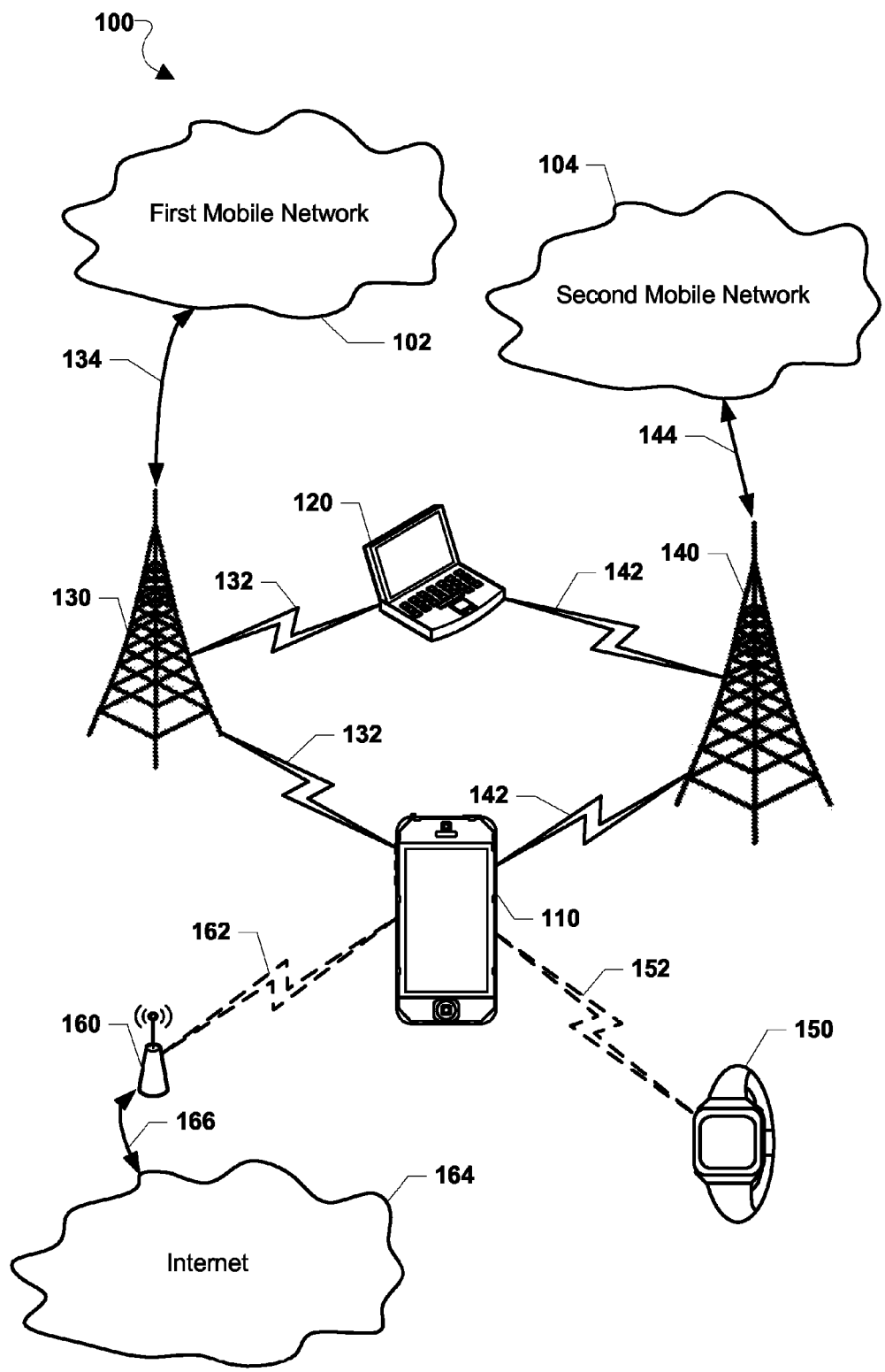
FIG. 1 is a communication system block diagram of mobile telephony networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the written description or the claims.

As used herein, the term "mobile communication device," "multi-SIM mobile communication device," or "multi-SIM device" refers to any one or all of cellular telephones, smart phones, personal or mobile multi-media players, personal data assistants, laptop computers, tablet computers, smart books, smart watches, palm-top computers, wireless electronic mail receivers, multimedia Internet-enabled cellular telephones, wireless gaming controllers, and similar personal electronic devices that includes one or more SIM cards, a programmable processor, memory, and circuitry for connecting to at least two mobile communication network with one or more shared radio frequency (RF) resources. Various embodiments may be useful in mobile communication devices, such as smart phones, and so such devices are referred to in the descriptions of various embodiments. However, the embodiments may be useful in any electronic devices that may individually maintain a plurality of subscriptions that utilize at least one shared RF chain, which may include one or more of antennae, radios, transceivers, etc.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a mobile communication device on a network and enable a communication service with the network. Because the information stored in a SIM enables the mobile communication device to establish a communication link for a particular communication service with a particular network, the term "subscription" is used herein as a shorthand reference to refer to the communication service associated with and enabled by the information stored in a particular SIM as the SIM and the communication network, as well as the services and subscriptions supported by that network, correlate to one another.

In the following descriptions of various embodiments, references are made to a first RAT and a second RAT. The references to the first and second RATs are arbitrary and are used merely for the purposes of describing the embodiments. The device processor may assign any indicator, name or other designation to differentiate the RATs on the mobile communication device.

In the following descriptions of various embodiments, references are made to specific RATs associated with specific SIMs/subscriptions or with specific PLMNs, such GSM RATs, GSM PLMNs, WCDMA RATs, WCDMA PLMNs, LTE RATs, and LTE PLMNs. The references to GSM, WCDMA, and LTE are arbitrary and used merely for the purposes of describing the embodiments. SIMs/subscriptions and PLMNs in various embodiments may utilize a variety of RATs to communicate with a mobile telephony network, including but not limited to 3G, 4G, LTE, TDMA, CDMA, WCDMA, GSM, and UMTS.

A mobile communication device may be capable of utilizing a number of RATs. For example, the mobile communication may include one or more SIMs, each SIM capable of utilizing one or more RATs. When conducting a PLMN search, the mobile communication device usually conducts a full scan of the frequency space for each RAT. For example, if a mobile communication device can communicate through GSM, WCDMA, and LTE RATs, the mobile communication device may conduct separate PLMN searches for GSM signals, WCDMA signals, and LTE signals. The multi-RAT PLMN search, when done sequentially, may take on the order of minutes to complete.

However, there are opportunities to reduce the amount of time that it takes to conduct the PLMN search. Only one RAT may utilize a given frequency band in a given geographic area. In other words, multiple RATs cannot utilize the same or overlapping frequency bands in the same area. Thus, if it can be determined that certain frequency bands are in use by a particular RAT, those frequencies may be excluded from the PLMN search for other RATs. For example, if during a LTE PLMN search the mobile communication device identifies two frequency bands that have LTE signals, those frequency bands may be excluded from the PLMN searches of other RATs. This approach reduces the amount of time for successive PLMN searches as more information is collected.

In overview, various embodiments provide systems and methods implemented with a processor of a mobile communication device (e.g., a multi-SIM mobile communication device) for conducting a PLMN search for a plurality of RATs on the mobile communication device. The processor may profile a frequency space to identify one or more frequency bands that may be utilized by one of the plurality of RATs. For example, the processor may obtain, for a plurality of narrow frequency bands in the frequency space, received signal strength values. Frequency bands may be identified as including a plurality of consecutive narrow frequency bands with received signal strength values above a threshold. In some embodiments the profile of the frequency space may be performed in parallel, such as by identifying frequencies bands within a frequency space in a single scan.

The processor may then determine, according to a priority ordering of the plurality of RATs, a RAT that utilizes each identified frequency band. For example, the processor may select each RAT according to the priority ordering and verify whether each of the identified frequency bands carry a signal for each selected RAT. The priority ordering may be based on the size of the frequency bandwidth of each RAT, such as ordering the RATs from largest frequency bandwidth to smallest frequency bandwidth.

The processor may add, for each RAT in the plurality of RATs, the identified frequency bands utilized by each RAT to exclude lists associated with other RATs. The processor may also add information from neighbor cell lists given by the networks to the exclude lists associated with each RAT. For example, the processor may determine whether the mobile communication device is camped on a RAT, obtain a neighbor cell list for the RAT if camped, check the validity of each neighbor cell in the neighbor cell list, and add each valid neighbor cell in the neighbor cell list to the exclude lists associated with the other RATs.

The processor may then conduct a PLMN search for each RAT utilizing the exclude lists associated with each RAT. For example, the processor may selecting a RAT from the plurality of RATs, conduct a PLMN search for the RAT while excluding frequencies listed in the exclude list associated with the selected RAT, and update the exclude lists of other RATs based on the PLMN search for the selected RAT.

Various embodiments may be implemented within a variety of communication systems 100, such as at least two mobile telephony networks, an example of which is illustrated in FIG. 1. A first mobile network 102 and a second mobile network 104 typically each include a plurality of cellular base stations (e.g., a first base station 130 and a second base station 140). A first mobile communication device 110 may be in communication with the first mobile network 102 through a cellular connection 132 to the first base station 130. The first mobile communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second mobile communication device 120 may similarly communicate with the first mobile network 102 through the cellular connection 132 to the first base station 130. The second mobile communication device 120 may also communicate with the second mobile network 104 through the cellular connection 142 to the second base station 140. The cellular connections 132 and 142 may be made through two-way wireless communication links, such as Third Generation (3G), Fourth Generation (4G), Long Term Evolution (LTE), Time Division Multiple Access (TDMA), Code Division Multiple Access (CDMA), Wideband CDMA (WCDMA), Global System for Mobile Communications (GSM), Universal Mobile Telecommunications Systems (UMTS), and other mobile telephony communication technologies.

While the mobile communication devices 110, 120 are shown connected to the first mobile network 102 and, optionally, to the second mobile network 104, in some embodiments (not shown), the mobile communication devices 110, 120 may include two or more subscriptions to two or more mobile networks and may connect to those subscriptions in a manner similar to those described herein.

In some embodiments, the first mobile communication device 110 may optionally establish a wireless connection 152 with a peripheral device 150 used in connection with the first mobile communication device 110. For example, the first mobile communication device 110 may communicate over a Bluetooth® link with a Bluetooth-enabled personal computing device (e.g., a "smart watch"). In some embodiments, the first mobile communication device 110 may optionally establish a wireless connection 162 with a wireless access point 160, such as over a Wi-Fi connection. The wireless access point 160 may be configured to connect to the Internet 164 or another network over a wired connection 166.

While not illustrated, the second mobile communication device 120 may similarly be configured to connect with the peripheral device 150 and/or the wireless access point 160 over wireless links.

Figure 2:
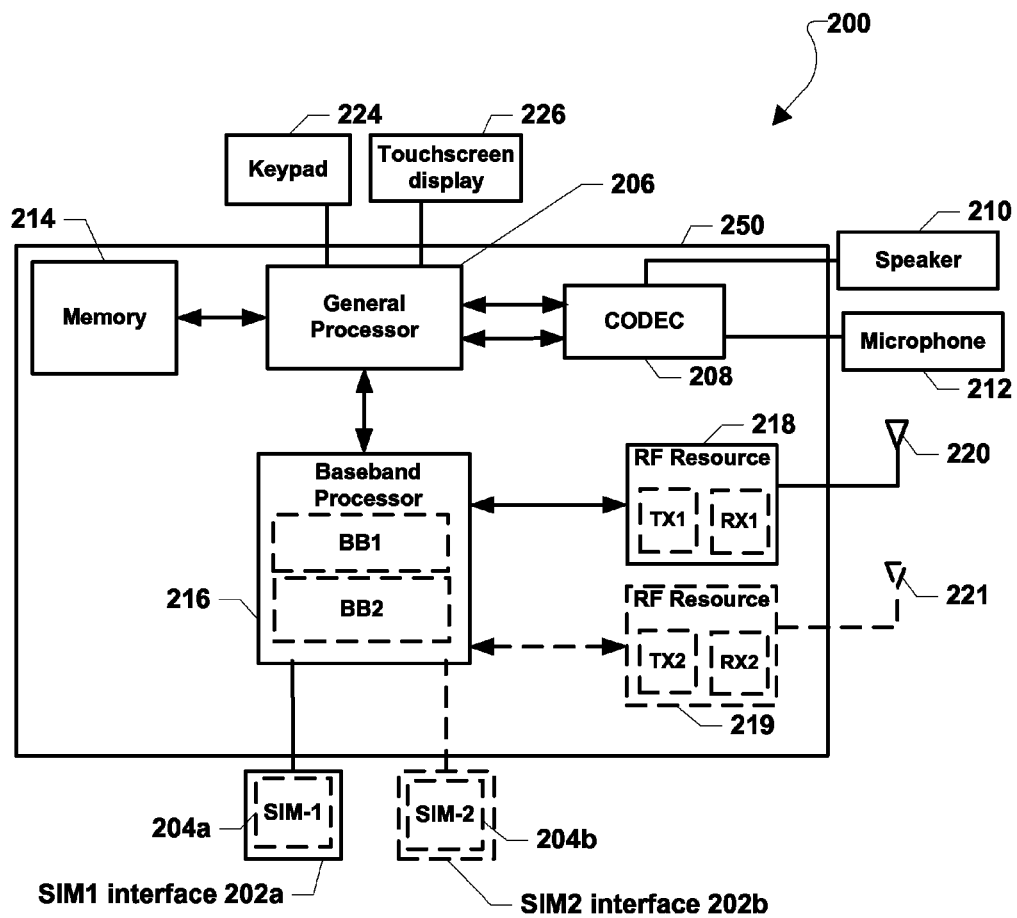
FIG. 2 is a component block diagram of a multi-SIM mobile communication device according to various embodiments.

FIG. 2 is a functional block diagram of a multi-SIM mobile communication device 200 suitable for implementing various embodiments. With reference to FIGS. 1-2, the multi-SIM mobile communication device 200 may be similar to one or more of the mobile communication devices 110, 120 as described. The multi-SIM mobile communication device 200 may include a first SIM interface 202a, which may receive a first identity module SIM-1 204a that is associated with a first subscription. The multi-SIM mobile communication device 200 may also optionally include a second SIM interface 202b, which may receive an optional second identity module SIM-2 204b that is associated with a second subscription.

A SIM in various embodiments may be a Universal Integrated Circuit Card (UICC) that is configured with SIM and/or Universal SIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a central processing unit (CPU), read only memory (ROM), random access memory (RAM), electrically erasable programmable read only memory (EEPROM) and input/out (I/O) circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home Public Land Mobile Number (HPLMN) code, etc.) to indicate the SIM card network operator provider. An Integrated Circuit Card Identity (ICCID) SIM serial number may be printed on the SIM card for identification. However, a SIM may be implemented within a portion of memory of the multi-SIM mobile communication device 200 (e.g., in a memory 214), and thus need not be a separate or removable circuit, chip or card.

The multi-SIM mobile communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer-readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data and may store exclude lists for RATs on the multi-SIM mobile communication device 200.

The general processor 206 and the memory 214 may each be coupled to at least one baseband modem processor 216. Each SIM and/or RAT in the multi-SIM mobile communication device 200 (e.g., the SIM-1 204a and/or the SIM-2 204b) may be associated with a baseband-RF resource chain. A baseband-RF resource chain may include the baseband modem processor 216, which may perform baseband/modem functions for communications with/controlling a RAT, and may include one or more amplifiers and radios, referred to generally herein as RF resources (e.g., RF resource 218, 219). In some embodiments, baseband-RF resource chains may share the baseband modem processor 216 (i.e., a single device that performs baseband/modem functions for all RATs on the multi-SIM mobile communication device 200). In other embodiments, each baseband-RF resource chain may include physically or logically separate baseband processors (e.g., BB1, BB2).

The RF resource 218 may be a transceiver that performs transmit/receive functions for each of the SIMs/RATs on the multi-SIM mobile communication device 200. The RF resource 218 may include separate transmit and receive circuitry, or may include a transceiver that combines transmitter and receiver functions. In some embodiments, the RF resource 218 may include multiple receive circuitries. The RF resource 218 may be coupled to a wireless antenna (e.g., a wireless antenna 220). The RF resource 218 may also be coupled to the baseband modem processor 216. In some optional embodiments, the multi-SIM mobile communication device 200 may include an optional RF resource 219 configured similarly to the RF resource 218 and coupled to an optional wireless antenna 221.

In some embodiments, the general processor 206, the memory 214, the baseband processor(s) 216, and the RF resources 218, 219 may be included in the multi-SIM mobile communication device 200 as a system-on-chip 250. In some embodiments, the first and second SIMs 204a, 204b and the corresponding interfaces 202a, 202b to each subscription may be external to the system-on-chip 250. Further, various input and output devices may be coupled to components on the system-on-chip 250, such as interfaces or controllers. Example user input components suitable for use in the multi-SIM mobile communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive selection of a contact from a contact list or receive a telephone number. As another example, the request to initiate the outgoing call may be in the form of a voice command received via the microphone 212. Interfaces may be provided between the various software modules and functions in the multi-SIM mobile communication device 200 to enable communication between them, as is known in the art.

Functioning together, the two SIMs 204a, 204b, the baseband processor BB1, BB2, the RF resources 218, 219, and the wireless antennas 220, 221 may constitute two or more radio access technologies (RATs). For example, the multi-SIM mobile communication device 200 may be a LTE communication device that includes a SIM, baseband processor, and RF resource configured to support two different RATs, such as LTE, WCDMA, and GSM. More RATs may be supported on the multi-SIM mobile communication device 200 by adding more SIM cards, SIM interfaces, RF resources, and antennae for connecting to additional mobile networks.

In some embodiments (not shown), the multi-SIM mobile communication device 200 may include, among other things, additional SIM cards, SIM interfaces, a plurality of RF resources associated with the additional SIM cards, and additional antennae for supporting subscriptions communications with additional mobile networks.

Figure 3A:
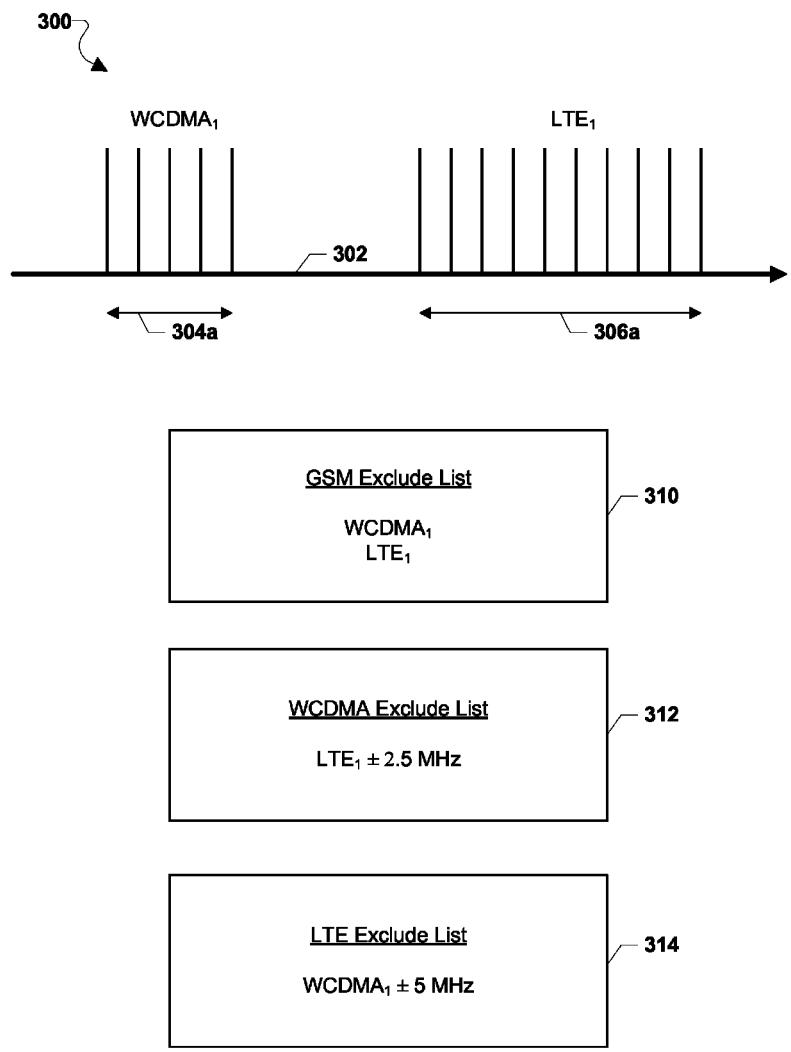
FIG. 3A shows an example of profiling of a frequency space according to various embodiments.

Diagram 300 in FIG. 3A illustrates an example of profiling of a frequency space in accordance with various embodiments. With reference to FIGS. 1-3A, the diagram 300 includes a linear representation of a frequency space 302. The frequency space 302 may span a range of frequencies that are used in a given geographic area for transmitting telecommunications signals for various RATs, such as 3G, 4G, LTE, WCDMA, CDMA, UMTS and GSM. For example, the frequency space 302 may span 40 MHz or more. During a normal PLMN search, a mobile communication device scans the whole frequency space 302 for each RAT. For example, the mobile communication device may scan the frequency space 302 once searching for GSM signals, then another time searching for WCDMA signals, and then a third time searching for LTE signals.

However, when multiple RATs are deployed in a given geographic area, the same frequency is not deployed for more than one RAT. In other words, the frequency bands used by each RAT do not overlap. Thus in various embodiments, the mobile communication device may profile the frequency space 302 and determine the frequency bands for signals of one or more RATs during a single scan, rather than in several consecutive scans, in order to speed up the PLMN search.

The mobile communication device may profile the frequency space 302 through consecutive narrow frequency band scans to identify frequency bands that are likely to carry signals for a RAT. For example, the mobile communication device may be configured to scan narrow frequency bands each having a width of 1 MHz. The mobile communication device may scan the frequency space 302 in consecutive increments of 1 MHz. In some embodiments, the mobile communication device may be capable of scanning several narrow bands during the same RF tuning cycle, which may shorten the amount of time for the profiling. For example, the mobile communication device may be able to scan up to six narrow band frequencies during a single RF tuning cycle. For each narrow band scan, the mobile communication device may determine a received signal strength value. If the mobile communication device detects several consecutive narrow bands (which may equal the bandwidth of a particular RAT) with high received signal strength, for example by comparing the received signal strength values to a threshold, it may be indicative of the presence of a signal for that particular RAT.

If the mobile communication device detects consecutive narrow frequency bands with received signal strength above a threshold, it is likely that a RAT signal is present within those consecutive narrow bands. For example, frequency band 304a includes five consecutive narrow frequency bands with received signal strength above a threshold, while frequency band 306a includes ten consecutive narrow frequency bands with received signal strength above a threshold.

Certain RATs, such as GSM, are narrow band technologies and so the mobile communication device may not be able to identify likely frequency bands for these RATs during profiling of the frequency space (e.g., the GSM frequency band may be less than 1 MHz). Certain other RATs, such as WCDMA and LTE, are wide band technologies. For example, a WCDMA frequency band may span 5 MHz, while an LTE frequency band may span 10 MHz or 20 MHz. Profiling of the frequency space may be used to identify likely frequency bands for wide band RATs. For example, the frequency band 304a may span 5 MHz and may correspond to a WCDMA frequency band, notated as $WCDMA_1$. Likewise, the frequency band 306a may span 10 MHz and may correspond to a LTE frequency band, notated as $LTE_1$. However, the frequency band 306a could also be two adjacent WCDMA frequency bands. After profiling the frequency space 302, the mobile communication device may determine, using a priority ordering of RATs, whether a RAT utilizes each frequency band (e.g., the frequency bands 304a, 306a) identified during profiling.

The frequency bands identified during the profiling of the frequency space are utilized by a particular RAT and so may not be used by other RATs. Thus during a PLMN scan for one RAT, the mobile communication device may skip or exclude frequency bands that are already known to be used by other RATs. The mobile communication device may store exclude lists 310, 312, and 314 associated with the GSM, WCDMA, and LTE RATs, respectively. The exclude lists 310, 312, and 314 may include frequency bands that are to be excluded during the PLMN search for that RAT because the bands are used by other RATs. The mobile communication device may determine, according to a priority ordering of RATs, a RAT that utilizes each identified frequency band and add those frequency bands to the exclude lists of other RATs. The priority ordering may be based on the size of the frequency bandwidth of each RAT so that the largest identified frequency bands are tested for the RATs having the largest frequency bandwidth first.

For example, a LTE RAT may utilize a 10 MHz bandwidth, a WCDMA RAT may utilize a 5 MHz bandwidth, and a GSM RAT may utilize a bandwidth less than 1 MHz (e.g., 0.2 MHz). The mobile communication device may select the RAT having the largest bandwidth first (i.e., LTE). The mobile communication device may determine whether any of the identified frequency bands span at least the same bandwidth as a LTE RAT and verify that those bands carry a LTE signal (e.g., by decoding the signal received on the frequency band). The frequency bands that do carry a LTE signal are added to the exclude lists of the other RATs, along with a buffer value. The buffer value may be equal to half the bandwidth of the RAT associated with the exclude list (i.e., the buffer value represents the minimum possible frequency difference between the edges of the LTE frequency band and the center of any possible frequency bands of the GSM or WCDMA RAT).

For example, the mobile communication device may determine that the profiled frequency band 306a belongs to an LTE signal with a frequency bandwidth $LTE_1$. The mobile communication device may add frequencies spanning $LTE_1$ to the exclude list 310 associated with the GSM RAT. The GSM RAT may have a bandwidth of less than 1 MHz, so a GSM frequency band may occur just outside of the frequency band 306a (i.e., there is a negligible buffer value). The mobile communication device may also add frequencies spanning $LTE_1 \pm 2.5$ MHz to the exclude list 312 associated with the WCDMA RAT. The WCDMA RAT may have a bandwidth of 5 MHz, so a WCDMA frequency band can only be centered at least 2.5 MHz outside of the frequency band 306a (i.e., a buffer value of 2.5 MHz).

The mobile communication device may then select the RAT having the next largest bandwidth (i.e., WCDMA), determine whether any of the remaining identified frequency bands span at least the same bandwidth as the WCDMA RAT (i.e., 5 MHz), and verify that those bands carry a WCDMA signal. The frequency bands that do carry a WCDMA signal are added to the exclude lists 310, 314 of the GSM and LTE RATs, respectively, along with a buffer value. For example, the mobile communication device may determine that the frequency band 304a belongs to a WCDMA signal with a frequency bandwidth $WCDMA_1$. The mobile communication device may add frequencies spanning $WCDMA_1$ to the exclude list 310 associated with the GSM RAT. The GSM RAT may have a bandwidth of less than 1 MHz, so a GSM frequency band may occur just outside of the frequency band 304a (i.e., there is a negligible buffer value). The mobile communication device may also add frequencies spanning $WCDMA_1 \pm 5$ MHz to the exclude list 314 associated with the LTE RAT. The LTE RAT may have a bandwidth of 10 MHz, so a LTE frequency band can only be centered at least 5 MHz outside of the frequency band 304a (i.e., a buffer value of 5 MHz).

Any additional wide band RATs may also be compared against the remaining frequency bands found during profiling in priority order, and then added to the exclude lists of other RATs.

Figure 3B:
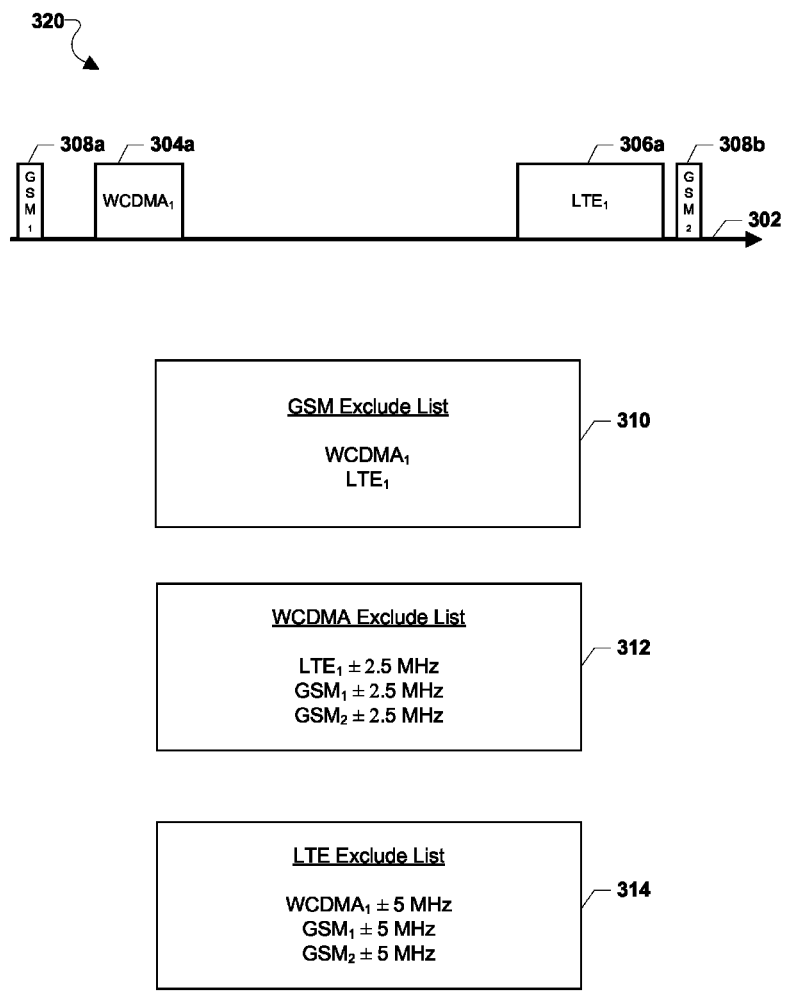
FIGS. 3B-3D show examples of PLMN searching according to various embodiments.
Figure 3C:
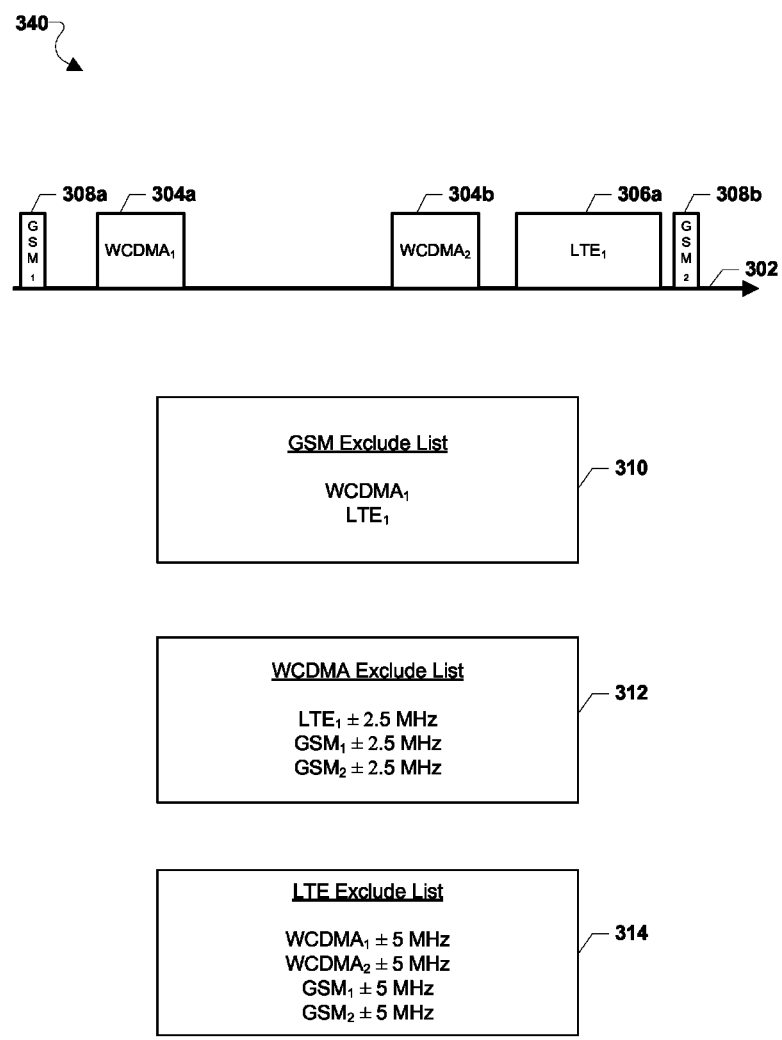
Figure 3D:
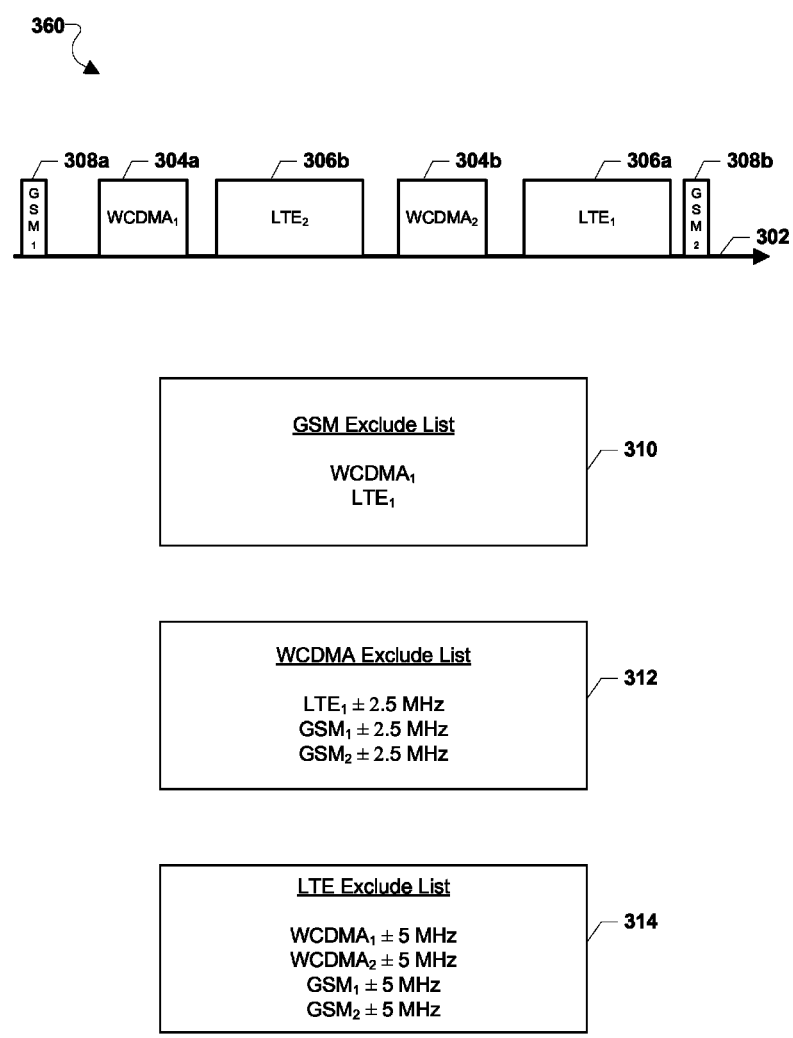

After profiling of the frequency space 302 and population of the exclude lists 310, 312, and 314, the mobile communication device may conduct a PLMN search for each RAT utilizing the exclude lists 310, 312, and 314 as illustrated in FIGS. 3B-3D. With reference to FIGS. 1-3D, the PLMN search for each RAT may be conducted in a certain order or may be unordered. For example, the PLMN search may be conducted in order of increasing frequency bandwidth, or in order of decreasing frequency bandwidth. FIGS. 3B-3D illustrate an example ordering for the PLMN search according to increasing frequency bandwidth in which the GSM PLMN search is conducted first, followed by the WCDMA PLMN search, and then the LTE PLMN search.

In diagram 320, the mobile communication device may conduct the GSM PLMN search first over the frequency space 302. The mobile communication device may utilize the exclude list 310 to determine which frequencies in the frequency space 302 may be excluded from the search. For example, the frequency bands 304a and 306a ($WCDMA_1$ and $LTE_1$) are in the exclude list 310 and may be excluded from the PLMN search. The mobile communication device may find two GSM frequency bands 308a and 308b, notated as $GSM_1$ and $GSM_2$ respectively, during the PLMN search. The $GSM_1$ and $GSM_2$ bands may be added to the exclude lists 312, 314 for the WCDMA and LTE RATs, respectively, along with the appropriate buffer value.

After the GSM PLMN search is complete, the mobile communication device may conduct the WCDMA PLMN search because the frequency bandwidth of the WCDMA RAT is larger than that of the GSM RAT but smaller than that of the LTE RAT. In diagram 340, the mobile communication device may utilize the exclude list 312 to determine which frequencies in the frequency space 302 may be excluded from the PLMN search. For example, the frequency ranges $GSM_1 \pm 2.5$ MHz, $GSM_2 \pm 2.5$ MHz, and $LTE_1 \pm 2.5$ MHz may be in the exclude list 312 and thus may be excluded. The $WCDMA_1$ frequency band 304a that was previously identified during profiling of the frequency space may also be excluded from the PLMN search. The mobile communication device may find a second WCDMA frequency band 304b during the PLMN search, notated as $WCDMA_2$. The $WCDMA_2$ frequency band 304b may be added to the exclude list 314 for the LTE RAT, along with the appropriate buffer value.

After the WCDMA PLMN search is complete, the mobile communication device may conduct the last PLMN search for the LTE RAT. In diagram 360, the mobile communication device may utilize the exclude list 314 to determine which frequencies in the frequency space 302 may be excluded from the search. For example, the frequency ranges $GSM_1 \pm 5$ MHz, $GSM_2 \pm 5$ MHz, $WCDMA_1 \pm 5$ MHz, and $WCDMA_2 \pm 5$ MHz may be in the exclude list 314 and thus may be excluded. The $LTE_1$ frequency band 306a that was previously identified during the profiling of the frequency space may also be excluded from the PLMN search. The mobile communication device may find a second LTE frequency band 306b during the PLMN search, notated as $LTE_2$. Thus utilizing the exclude lists 310, 312, and 314 may shorten the amount of time necessary to complete the PLMN searches for each RAT because a significant amount of frequencies may be excluded from each search.

Additional information may be added to the exclude lists 310, 312, and 314 before performing the prioritized PLMN search. If the mobile communication device is camped on one or more RATs, the mobile communication device may be able to decode the system information block (SIB) for those RATs and obtain the neighbor cell list for each camped RAT. The neighbor cell list contains the other frequency bands utilized by the RAT in the frequency space 302, and so the neighbor cell information may be added to the exclude lists.

Figure 4A:
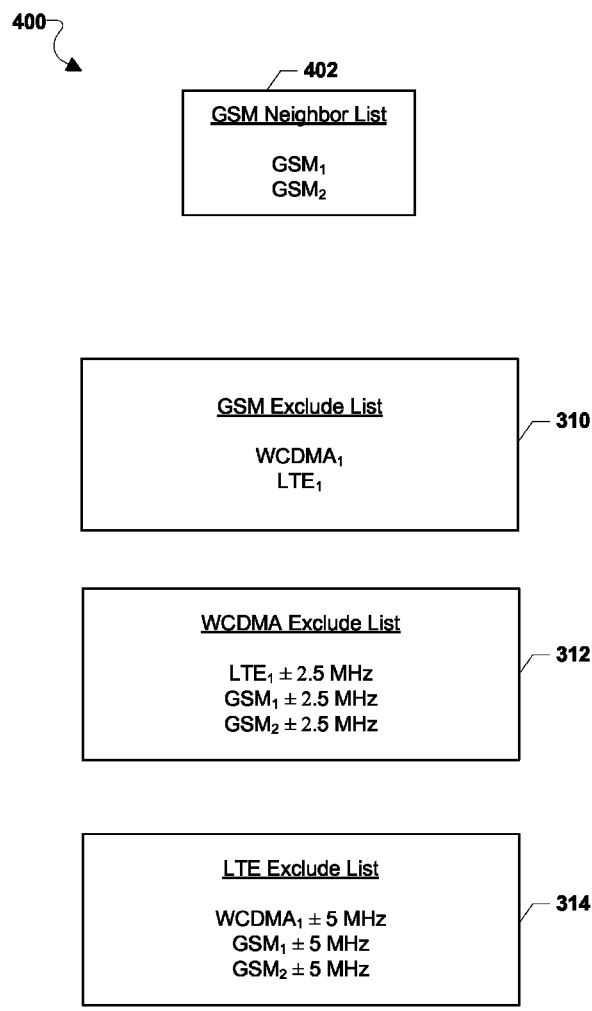
FIGS. 4A-4C show examples of utilizing neighbor cell lists to update exclude lists during a PLMN search according to various embodiments.
Figure 4B:
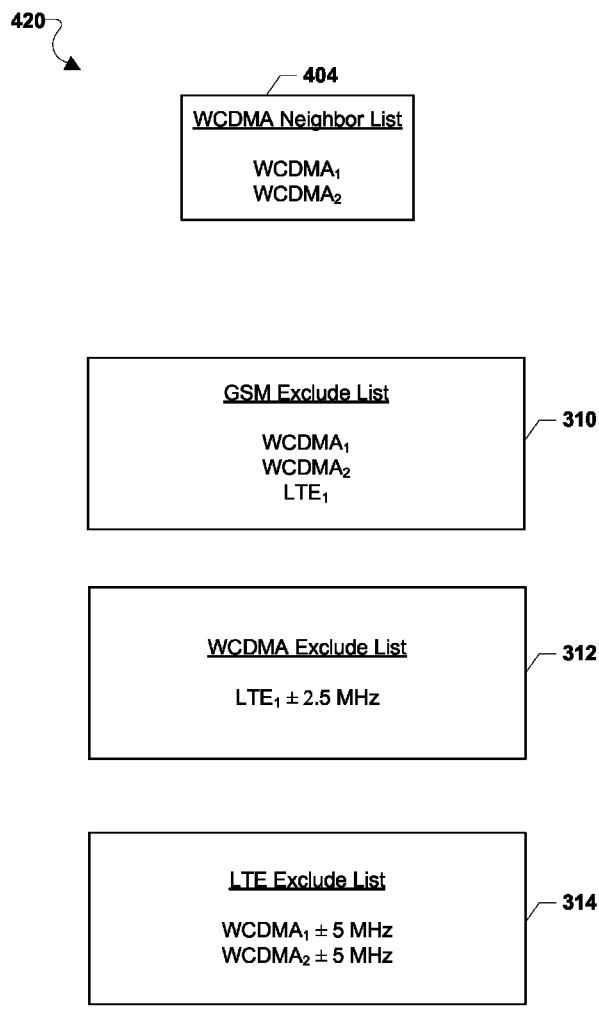
Figure 4C:
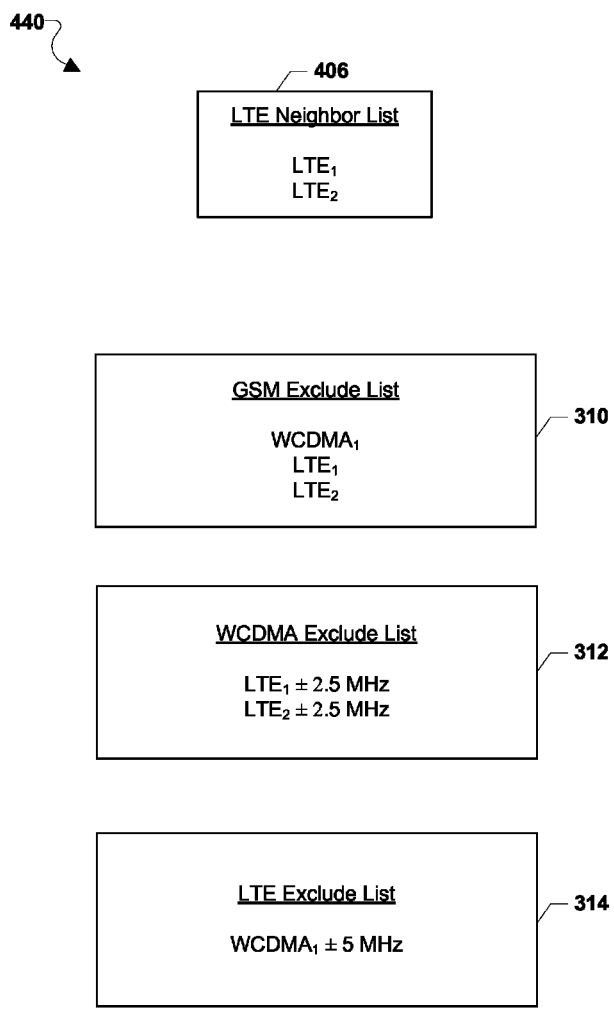

FIGS. 4A-4C illustrate diagrams for adding information from neighbor cell lists for a certain RAT to the exclude lists of other RATs. With reference to FIGS. 1-4C, diagram 400 includes a neighbor cell list 402 for a GSM RAT that the mobile communication device may obtain when camped to the network on the GSM RAT. The network may occasionally send a SIB to the mobile communication device, which contains a neighbor cell list of neighboring cells belonging to the network that communicate using the GSM RAT.

The neighbor cell list 402 includes two neighboring GSM frequency bands $GSM_1$ and $GSM_2$. The mobile communication device may verify the validity of the neighbor cell list 402 (e.g., by decoding the signals obtained from the frequency bands $GSM_1$ and $GSM_2$). Upon validation, these neighboring GSM frequency bands may be added to the exclude lists 312, 314 of the WCDMA and LTE RATs, respectively, along with the appropriate buffer values.

The mobile communication device may then conduct a PLMN search on the remaining RATs utilizing the exclude lists 312 and 314. For example, the mobile communication device may conduct the PLMN search for the WCDMA RAT first, excluding frequencies are found in the exclude list 314 (e.g., the $LTE_1$, $GSM_1$, and $GSM_2$ frequency bands with buffer values of $\pm 2.5$ MHz). The mobile communication device may add any WCDMA frequency bands that are found during the search to the exclude list 314 of the LTE RAT. The mobile communication device may then conduct the PLMN search for the LTE RAT, excluding frequencies are found in the exclude list 314 (e.g., the $WCDMA_1$ and any additional identified WCDMA frequency bands, and the $GSM_1$ and $GSM_2$ frequency bands along with buffer values of $\pm 5$ MHz). The mobile communication device does not have to conduct a PLMN search for the GSM RAT because the neighbor cell list 402 already contains all the GSM frequency bands.

Diagram 420 in FIG. 4B includes a neighbor cell list 404 for a WCDMA RAT that the mobile communication device may obtain when camped to the network on the WCDMA RAT. The network may occasionally send a SIB to the mobile communication device, which contains a neighbor cell list of neighboring cells belonging to the network that communicate using the WCDMA RAT. The neighbor cell list 404 includes two neighboring WCDMA frequency bands $WCDMA_1$ (the frequency band 304a) and $WCDMA_2$. The mobile communication device may verify the validity of the neighbor cell list 404 (e.g., by decoding the signals obtained from the frequency bands $WCDMA_1$ and $WCDMA_2$). Upon validation, these neighboring WCDMA frequency bands may be added to the exclude lists 310, 314 of the GSM and LTE RATs, respectively, along with appropriate buffer values.

The mobile communication device may then conduct a PLMN search on the remaining RATs utilizing the exclude lists 310 and 314. For example, the mobile communication device may conduct the PLMN search for the GSM RAT first, excluding frequencies are found in the exclude list 310 (e.g., the $LTE_1$, $WCDMA_1$, and $WCDMA_2$ frequency bands). The mobile communication device may add any GSM frequency bands that are found to the exclude list 314 of the LTE RAT. The mobile communication device may then conduct the PLMN search for the LTE RAT, excluding frequencies are found in the exclude list 314 (e.g., any identified GSM frequency bands, and the $WCDMA_1$ and $WCDMA_2$ frequency bands along with buffer values of $\pm 5$ MHz). The mobile communication device does not have to conduct a PLMN search for the WCDMA RAT because the neighbor cell list 404 already contains all the WCDMA frequency bands.

Diagram 440 in FIG. 4C includes a neighbor cell list 406 for a LTE RAT that the mobile communication device may obtain when camped to the network on the LTE RAT. The network may occasionally send a SIB to the mobile communication device, which contains a neighbor cell list of neighboring cells belonging to the network that communicate using the LTE RAT. The neighbor cell list 406 includes two neighboring LTE frequency bands $LTE_1$ (the frequency band 306a) and $LTE_2$. The mobile communication device may verify the validity of the neighbor cell list 406 (e.g., by decoding the signals obtained from the frequency bands $LTE_1$ and $LTE_2$). Upon validation, these neighboring LTE frequency bands may be added to the exclude lists 310, 312 of the GSM and WCDMA RATs, respectively.

The mobile communication device may then conduct a PLMN search on the remaining RATs utilizing the exclude lists 310 and 312. For example, the mobile communication device may conduct the PLMN search for the GSM RAT first, excluding frequencies are found in the exclude list 310 (e.g., the $WCDMA_1$, $LTE_1$, and $LTE_2$ frequency bands). The mobile communication device may add any GSM frequency bands that are found to the exclude list 312 of the WCDMA RAT. The mobile communication device may then conduct the PLMN search for the WCDMA RAT, excluding frequencies are found in the exclude list 312 (e.g., any identified GSM frequency bands, and the $LTE_1$ and $LTE_2$ frequency bands along with buffer values of $\pm 2.5$ MHz). The mobile communication device does not have to conduct a PLMN search for the LTE RAT because the neighbor cell list 406 already contains all the LTE frequency bands.

If a mobile communication device is camped on multiple RATs, then the neighbor cell lists from each camped RAT may be used to update the exclude lists 310, 312, and 314. For example, if the mobile communication device is camped on both the GSM and LTE RATs, then the neighbor cell lists 402 and 406 may both be used to update the exclude lists 310, 312, and 314. The mobile communication device may create a unified neighbor cell list from the separate neighbor cell lists before updating the exclude lists.

Figure 5:
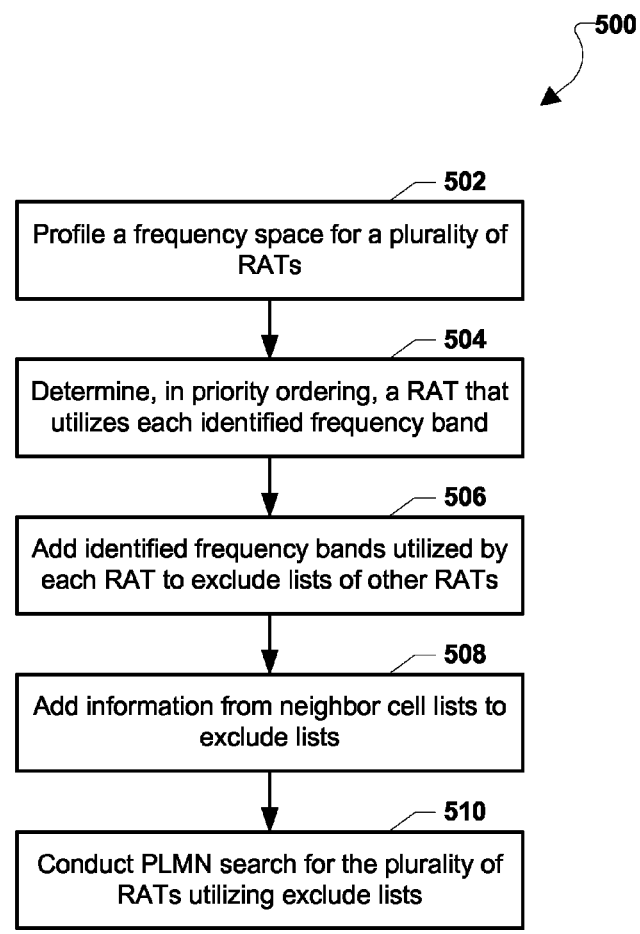
FIG. 5 is a process flow diagram illustrating a method for conducting a PLMN search on a mobile communication device according to various embodiments.

FIG. 5 illustrates a method 500 for conducting a PLMN search for a plurality of RATs (e.g., LTE, WCDMA, and GSM) on a mobile communication device according to various embodiments. With reference to FIGS. 1-5, the method 500 may be implemented with a processor (e.g., the general processor 206, the baseband modem processor 216, a separate controller, and/or the like) of a mobile communication device (such as the mobile communication devices 110, 120, 200) that supports one or more SIMs/subscriptions.

In block 502, the device processor may profile a frequency space for the plurality of RATs. The mobile communication device may be configured to perform a scan of consecutive narrow frequency bands (e.g., 1 MHz bands) in the frequency space. In some embodiments, the mobile communication device may be capable of scanning several narrow bands during the same RF tuning cycle, which may shorten the amount of time for the profiling. In some embodiments, the mobile communication device may profile the frequency space in parallel. For each narrow band scan, the device processor may obtain a received signal strength value. The device processor may identify frequency bands that may be utilized by one of the plurality of RATs from the narrow band frequency scan. For example, if the device processor detects consecutive narrow bands with high received signal strength (e.g., by comparing the received signal strength to a threshold), it may be indicative of the presence of a frequency band utilized by a RAT.

In block 504, the device processor may determine, in a priority ordering of the plurality of RATs, a RAT that utilizes each frequency band identified in the profiling. The priority ordering may be based on the frequency bandwidth of each RAT in the plurality of RATs. In some embodiments, the RATs may be ordered from largest frequency bandwidth to smallest frequency bandwidth. The device processor may select the RAT having the largest frequency bandwidth first and attempt to match identified frequency bands with the selected RAT. For example, a WCDMA frequency band may span 5 MHz, while an LTE frequency band may span 10 MHz. The device processor may select the LTE RAT first and then determine whether there are any identified frequency bands that span at least 10 MHz (e.g., ten consecutive 1 MHz narrow bands with received signal strength above the threshold). The device processor may then verify whether those frequency bands actually carry a LTE signal (e.g., by decoding the signals received in those bands).

Figure 6:
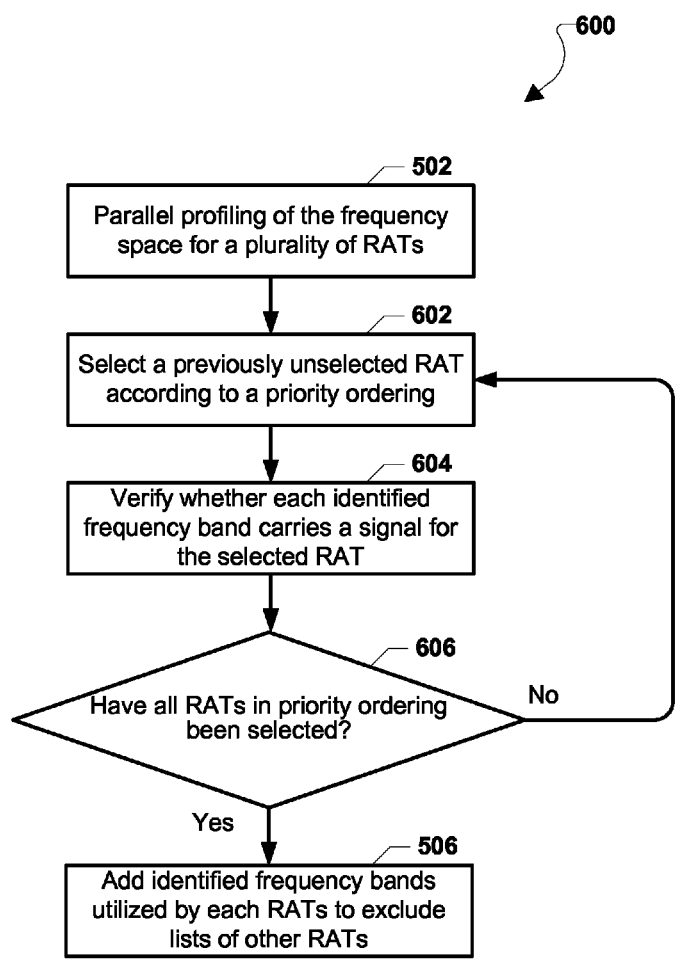
FIG. 6 is a process flow diagram illustrating a method for determining RATs that utilize identified frequency bands according to a priority ordering according to various embodiments.

The device processor may then do the same for the RAT with the next largest frequency band and the remaining identified frequency bands that have not been verified to carry a LTE signal. For example, the device processor may select the WCDMA RAT and determine whether there are any identified frequency bands that span at least 5 MHz (e.g., five consecutive 1 MHz narrow bands with received signal strength above the threshold). The device processor may then verify whether those frequency bands actually carry a WCDMA signal (e.g., by decoding the signals received in those bands). Determining RATs that utilize each identified frequency band according to a priority ordering is further discussed with reference to method 600 (FIG. 6).

In block 506, the device processor may add, for each RAT in the plurality of RATs, the identified frequency bands utilized by that RAT to exclude lists associated with each other RAT in the plurality of RATs. For example, if the device processor identified a LTE frequency band and a WCDMA frequency band during the profiling, the LTE frequency band may be added to the exclude lists of the WCDMA and GSM RATs. Likewise, the WCDMA frequency band may be added to the exclude lists of the LTE and GSM RATs. The exclude lists may be utilized to determine frequency bands that may be excluded when conducting the PLMN search because different RATs cannot utilize overlapping frequency bands in a given geographic area.

Figure 7:
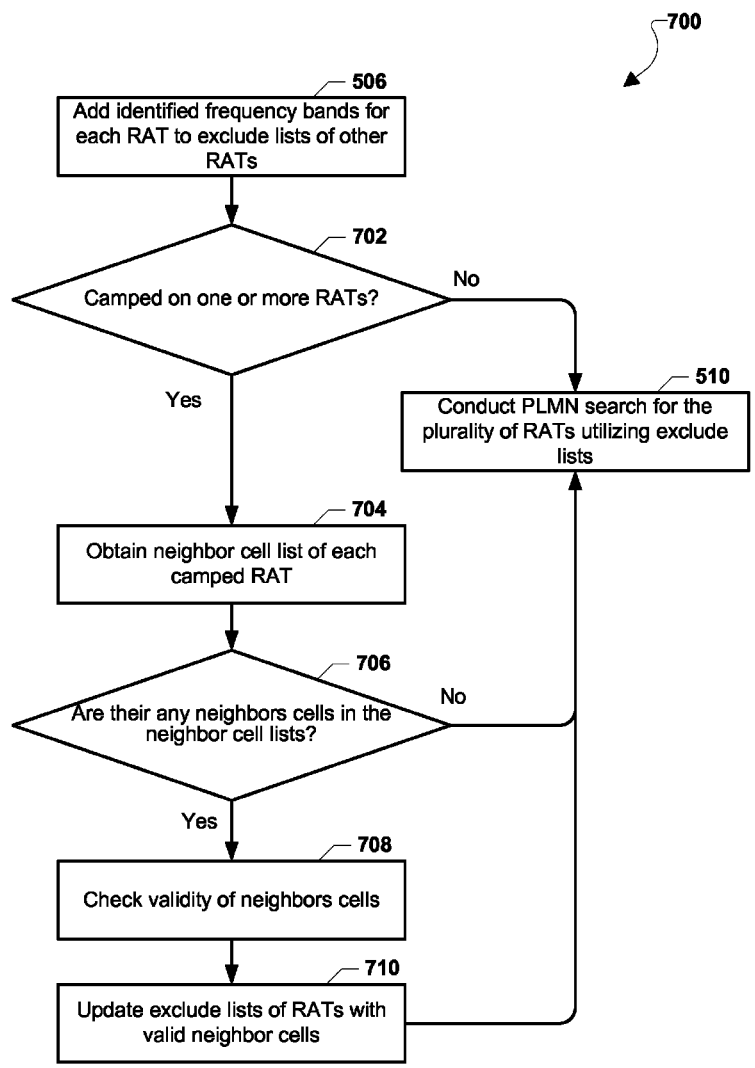
FIG. 7 is a process flow diagram illustrating a method for adding information from neighbor cell lists to exclude lists during a PLMN search according to various embodiments.

In block 508, the device processor may add information from a neighbor cell list obtained from a network to the exclude lists for the plurality of RATs. The mobile communication device may be camped on one or more network base station through one or more RATs, and each network base station may occasionally send a SIB to the mobile communication device. The SIB contains a neighbor cell list, which includes frequency bands utilized by a RAT on the same network. This information may be added to the exclude lists of other RATs in the plurality of RATs. Operations involved in adding information from neighbor cell lists in block 508 is further discussed with reference to method 700 (FIG. 7).

Figure 8:
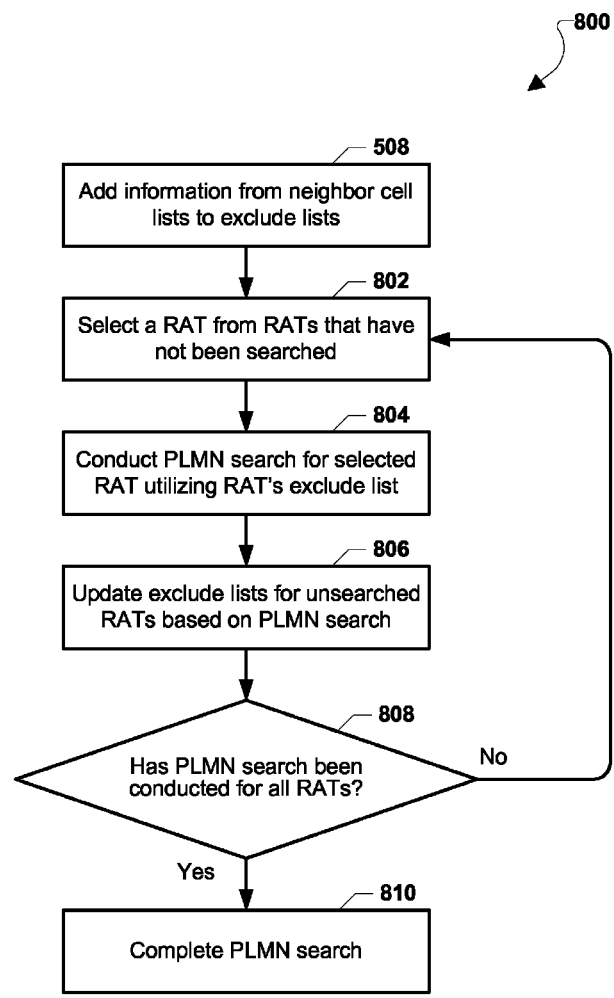
FIG. 8 is a process flow diagram illustrating a method for PLMN searching utilizing exclude lists according to various embodiments.

In block 510, the device processor may conduct a PLMN search for the plurality of RATs utilizing the exclude lists associated with each RAT. In some embodiments, the PLMN search may be unordered. In other embodiments, the PLMN search may be ordered based on the frequency bandwidth for each RAT. For example, the RAT with the smallest frequency bandwidth may be selected first for the PLMN search, and then the RAT with the next smallest frequency bandwidth may be searched next, and so on. For example, a 0.2 MHz wide GSM RAT may be searched first, followed by a 5 MHz wide WCDMA RAT, and then a 10 MHz LTE RAT. When the PLMN search is conducted for a particular RAT, frequency bands that are listed in the exclude list associated with the RAT may be excluded from the search because other RATs are utilizing those frequency bands. During the PLMN search, any additional frequency bands that are utilizes by the selected RAT may be added to the exclude lists of the unsearched RATs. Conducting a PLMN search is further discussed with reference to method 800 (FIG. 8). In this manner, the method 500 provides an efficient way to conduct a PLMN search for a plurality of RATs by utilizing parallel profiling and prioritized matching between RATs and identified frequency bands.

FIG. 6 illustrates a method 600 for determining, according to a priority ordering of the plurality of RATs, a RAT that utilizes frequency bands identified through profiling of the frequency space by a mobile communication device according to various embodiments. With reference to FIGS. 1-6, the method 600 may be implemented with a processor (e.g., the general processor 206, the baseband modem processor 216, a separate controller, and/or the like) of a mobile communication device (such as the mobile communication devices 110, 120, 200) that supports one or more SIMs/subscriptions.

The method 600 may be performed when the device processor determines, according to a priority ordering of the plurality of RATs, a RAT that utilizes each identified frequency band in block 504. After profiling a frequency space for the plurality of RATs in block 502, the device processor may select a previously unselected RAT in the plurality of RATs according to a priority ordering in block 602. The priority ordering may be based on the size of the frequency bandwidth for each RAT in the plurality of RATs. For example, the RAT with the largest frequency bandwidth may be ordered first, followed by the next largest, and so on. In some embodiments, the priority ordering may only include wide-band RATs (e.g., LTE, WCDMA) but not narrow band RATs (e.g., GSM).

In block 604, the device processor may verify whether any of the frequency bands identified in the profiling carry a signal for the selected RAT. For example, the device processor may determine whether an identified frequency band is at least as large as the frequency bandwidth for the selected RAT. If so, the device processor may decode the signals received in the frequency band to determine whether the signals correspond to the selected RAT.

After verifying whether the selected RAT utilizes any identified frequency bands, the device processor may determine whether all the RATs in the priority ordering have been selected in determination block 606. If the device processor determines that not all the RATs in the priority ordering have been selected (i.e., determination block 606="No"), the device processor may select another previously unselected RAT according to the priority ordering in block 602, and then verifies whether the RAT utilizes any of the remaining identified frequency bands. If the device processor determines that all the RATs in the priority ordering have been selected (i.e., determination block 606="Yes"), the device processor may add identified frequency bands utilized by each RAT to the exclude lists of other RATs in the plurality of RATs in block 506. In this manner, the method 600 implements a priority ordering for determining which RATs utilize the frequency bands identified through profiling of the frequency space.

FIG. 7 illustrates a method 700 for adding information from a neighbor cell list obtained from a network to exclude lists for a plurality of RATs utilized by a mobile communication device according to various embodiments. With reference to FIGS. 1-7, the method 700 includes operations that may be performed in block 508 of the method 500, and may be implemented with a processor (e.g., the general processor 206, the baseband modem processor 216, a separate controller, and/or the like) of a mobile communication device (such as the mobile communication devices 110, 120, 200) that supports one or more SIMs/subscriptions.

After adding identified frequency bands utilized by each RAT to the exclude lists for other RATs in block 506, the device processor may determine whether the mobile communication device is camped on one or more RATs (i.e., whether the mobile communication device is connected to one or more network base stations using particular RATs) in determination block 702.

In response to determining that the mobile communication device is not camped on any RAT (i.e., determination block 702="No"), the device processor may proceed to conduct a PLMN search for the plurality of RATs utilizing the exclude lists in block 510. In other words, if the mobile communication device is not connected with any network service, no neighbor cell lists may be obtained and so the mobile communication device proceeds with the PLMN search.

In response to determining that the mobile communication device is camped on one or more RATs (i.e., determination block 702="Yes"), the device processor may obtain a neighbor cell list of each camped RAT in block 704. The network base stations may occasionally send SIBs to the mobile communication device. The device processor may decode the SIBs to obtain the neighbor cell lists for each camped RAT.

In determination block 706, the device processor may determine whether there are any neighbor cells in the neighbor cell lists (i.e., whether the neighbor cell lists are empty). In response to determining that there are no neighbor cells in the neighbor cell lists (i.e., determination block 706="No"), the device processor may conduct a PLMN search for the plurality of RATs utilizing the exclude lists in block 510 of the method 500 as described. In other words, if the neighbor cell lists are empty, there is no additional information that may be added to the exclude lists and so the device processor proceeds to the PLMN search.

In response to determining that there are neighbor cells in the neighbor cell lists (i.e., determination block 706="Yes"), the device processor may check the validity of the neighbor cells in the neighbor cell lists in block 708. For example, the device processor may attempt to read and decode signals on the frequency bands for the neighbor cells to verify that a network base station is transmitting on those frequencies.

In block 710, the device processor may update the exclude lists of the other RATs with the frequency bands of the neighbor cells in the neighbor cell lists. For example, if the mobile communication device is camped to the network on a LTE RAT, the neighbor cell list contains frequency bands for LTE neighbor cells. These frequency bands may be added to the exclude lists of other RATs (e.g., WCDMA, GSM). The device processor may then conduct a PLMN search for the plurality of RATs utilizing the exclude lists in block 510 of the method 500 as described. In this manner, the method 700 allows a mobile communication device to update exclude lists with information from neighbor cell lists.

FIG. 8 illustrates a method 800 for conducting a PLMN search for a plurality of RATs on a mobile communication device utilizing exclude lists according to various embodiments. With reference to FIGS. 1-8, the method 800 may be implemented with a processor (e.g., the general processor 206, the baseband modem processor 216, a separate controller, and/or the like) of a mobile communication device (such as the mobile communication devices 110, 120, 200) that supports one or more SIMs/subscriptions.

The method 800 may be performed when the device processor conducts a PLMN search in block 510. After adding information from neighbor cell lists to the exclude lists in block 508, the device processor may select a RAT from the plurality of RATs that has not yet been searched in block 802. The selection may be unordered or based on an ordering (e.g., smallest to largest frequency bandwidth of each RAT, or vice versa). For example, if the plurality of RATs includes a GSM RAT that utilizes a 0.2 MHz bandwidth, a WCDMA RAT that utilizes a 5 MHz bandwidth, and a LTE RAT that utilizes a 10 MHz bandwidth, the device processor may select the GSM RAT first.

In block 804, the device processor may conduct a PLMN search for the selected RAT over the frequency space utilizing its associated exclude list. The exclude list contains frequency bands that are being used by other RATs. Different RATs cannot utilize the same frequencies in a given geographic area, and so excluding already-used frequencies shortens the time to complete the PLMN search. The exclude list may be created through profiling of the frequency space in blocks 502, 504, and 506, and additional information obtained from neighbor cell lists in block 508.

In block 806, the device processor may update the exclude lists for the unsearched RATs based on the PLMN search for the currently selected RAT. If frequency bands that are used by the selected RAT are identified during the PLMN search, those frequency bands are added to the exclude lists for the unsearched RATs so that when the unsearched RATs are searched, the frequency bands used by the selected RAT may be excluded from the search.

In determination block 808, the device processor may determine whether the PLMN search has been conducted for all RATs. In response to determining that the PLMN search has not been conducted for all RATs (i.e., determination block 808="No"), the device processor may select another RAT from the plurality of RATs that has not yet been searched in block 802. In response to determining that the PLMN search has been conducted for all RATs (i.e., determination block 808="Yes"), the device processor may complete the PLMN search process in block 810. In this manner, the method 800 provides a way to initiate a prioritized PLMN search utilizing exclude lists.

Figure 9:
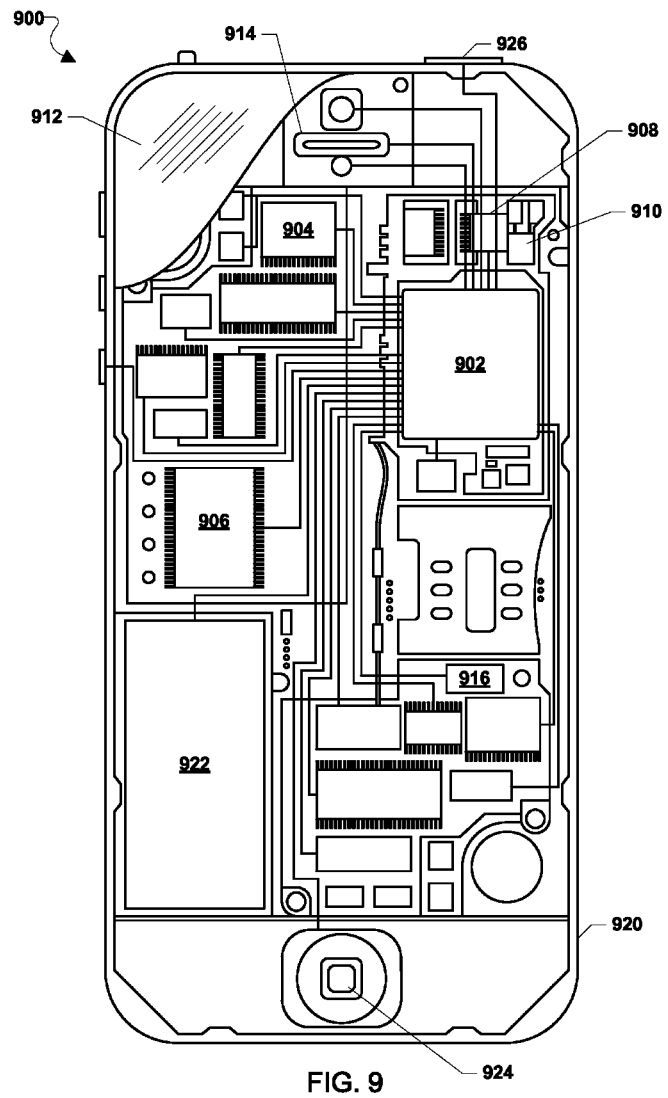
FIG. 9 is a component block diagram of a mobile communication device suitable for implementing some embodiment methods.

Various embodiments may be implemented in any of a variety of communication devices, an example of which (e.g., multi-SIM mobile communication device 900) is illustrated in FIG. 9. With reference to FIGS. 1-9, the multi-SIM mobile communication device 900 may be similar to the mobile communication devices 110, 120, 200, as described. As such, the multi-SIM mobile communication device 900 may implement the methods 500, 600, 700, and 800 according to various embodiments.

The multi-SIM mobile communication device 900 may include a processor 902 coupled to a touchscreen controller 904 and an internal memory 906. The processor 902 may be one or more multi-core integrated circuits designated for general or specific processing tasks. The internal memory 906 may be volatile or non-volatile memory, and may also be secure and/or encrypted memory, or unsecure and/or unencrypted memory, or any combination thereof. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the multi-SIM mobile communication device 900 need not have touch screen capability.

The multi-SIM mobile communication device 900 may have one or more cellular network transceivers 908 coupled to the processor 902 and to one or more antennas 910 and configured for sending and receiving cellular communications. The one or more transceivers 908 and the one or more antennas 910 may be used with the herein-mentioned circuitry to implement various embodiment methods. The multi-SIM mobile communication device 900 may include one or more SIM cards 916 coupled to the one or more transceivers 908 and/or the processor 902 and may be configured as described herein.

The multi-SIM mobile communication device 900 may also include speakers 914 for providing audio outputs. The multi-SIM mobile communication device 900 may also include a housing 920, constructed of a plastic, metal, or a combination of materials, for containing all or some of the components discussed herein. The multi-SIM mobile communication device 900 may include a power source 922 coupled to the processor 902, such as a disposable or rechargeable battery. The rechargeable battery may also be coupled to the peripheral device connection port to receive a charging current from a source external to the multi-SIM mobile communication device 900. The multi-SIM mobile communication device 900 may also include a physical button 924 for receiving user inputs. The multi-SIM mobile communication device 900 may also include a power button 926 for turning the multi-SIM mobile communication device 900 on and off.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configurations. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc in which disks usually reproduce data magnetically, while discs reproduce data optically with lasers. Combinations of the storage media are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to some embodiments without departing from the spirit or scope of the written description. Thus, the present disclosure is not intended to be limited to the embodiments shown herein but is to be accorded the widest scope consistent with the following claims and the principles and novel features disclosed herein.

What is claimed is:

1. A method of conducting a public land mobile network (PLMN) search for a plurality of radio access technologies (RATs) on a mobile communication device, comprising:
   profiling a frequency space to identify one or more frequency bands that may be utilized by one of the plurality of RATs;
   determining, according to a priority ordering of the plurality of RATs, a RAT that utilizes each identified frequency band, wherein the priority ordering is based on a size of a frequency bandwidth of each RAT of the plurality of RATs;
   adding, for each RAT in the plurality of RATs, the identified frequency bands utilized by each RAT to exclude lists associated with other RATs in the plurality of RATs; and
   conducting a PLMN search for each RAT in the plurality of RATs utilizing the exclude lists associated with each RAT.

2. The method of claim 1, wherein profiling the frequency space comprises:
   obtaining, for a plurality of narrow frequency bands in the frequency space, received signal strength values; and
   identifying the one or more frequency bands, wherein each identified frequency band comprises a plurality of consecutive narrow frequency bands with received signal strength values above a threshold.

3. The method of claim 2, wherein each narrow frequency band spans 1 MHz.

4. The method of claim 1, wherein determining, according to the priority ordering of the plurality of RATs, a RAT that utilizes each identified frequency band comprises:
   selecting a RAT in the plurality of RATs according to the priority ordering; and
   verifying whether each of the identified frequency bands carry a signal for the selected RAT.

5. The method of claim 1, wherein the priority ordering orders the plurality of RATs from largest frequency bandwidth to smallest frequency bandwidth.

6. The method of claim 1, the method further comprising adding information from neighbor cell lists to the exclude lists associated with each RAT in the plurality of RATs.

7. The method of claim 6, wherein adding information from neighbor cell lists to the exclude lists associated with each RAT in the plurality of RATs comprises:
   determining whether the mobile communication device is camped on a first RAT in the plurality of RATs;
   obtaining a neighbor cell list for the first RAT in response to determining that the mobile communication device is camped on the first RAT;
   checking the validity of each neighbor cell in the neighbor cell list; and
   adding each valid neighbor cell in the neighbor cell list to the exclude lists associated with each RAT in the plurality of RATs, excluding the first RAT.

8. The method of claim 1, wherein conducting the PLMN search for each RAT in the plurality of RATs utilizing the exclude lists associated with each RAT comprises:
   selecting a first RAT from the plurality of RATs;
   conducting the PLMN search for the first RAT, wherein the PLMN search excludes frequencies listed in the exclude list associated with the first RAT; and
   updating the exclude lists of each RAT in the plurality of RATs, excluding the first RAT, based on the PLMN search for the first RAT.

9. The method of claim 8, wherein updating the exclude lists of each RAT in the plurality of RATs, excluding the first RAT, based on the PLMN search for the first RAT comprises:
   identifying a first frequency band utilized by the first RAT during the PLMN search; and
   adding the first frequency band to the exclude lists of each RAT in the plurality of RATs, excluding the first RAT.

10. A mobile communication device, comprising:
    a radio frequency (RF) resource configured to support a plurality of radio access technologies (RATs); and
    a processor coupled to the RF resource and configured with processor executable instructions to:
      profile a frequency space to identify one or more frequency bands that may be utilized by one of the plurality of RATs;
      determine, according to a priority ordering of the plurality of RATs, a RAT that utilizes each identified frequency band, wherein the priority ordering is based on a size of a frequency bandwidth of each RAT of the plurality of RATs;
      add, for each RAT in the plurality of RATs, the identified frequency bands utilized by each RAT to exclude lists associated with other RATs in the plurality of RATs; and
      conduct a public land mobile network (PLMN) search for each RAT in the plurality of RATs utilizing the exclude lists associated with each RAT.

11. The mobile communication device of claim 10, wherein the processor is further configured with processor-executable instructions to profile the frequency space by:
    obtaining, for a plurality of narrow frequency bands in the frequency space, received signal strength values; and identifying the one or more frequency bands, wherein each identified frequency band comprises a plurality of consecutive narrow frequency bands with received signal strength values above a threshold.

12. The mobile communication device of claim 11, wherein each narrow frequency band spans 1 MHz.

13. The mobile communication device of claim 10, wherein the processor is further configured with processor-executable instructions to determine, according to the priority ordering of the plurality of RATs, a RAT that utilizes each identified frequency band by:
   selecting a RAT in the plurality of RATs according to the priority ordering; and
   verifying whether each of the identified frequency bands carry a signal for the selected RAT.

14. The mobile communication device of claim 10, wherein the priority ordering orders the plurality of RATs from largest frequency bandwidth to smallest frequency bandwidth.

15. The mobile communication device of claim 10, wherein the processor is further configured with processor-executable instructions to add information from neighbor cell lists to the exclude lists associated with each RAT in the plurality of RATs.

16. The mobile communication device of claim 15, wherein the processor is further configured with processor-executable instructions to add information from neighbor cell lists to the exclude lists associated with each RAT in the plurality of RATs by:
   determining whether the mobile communication device is camped on a first RAT in the plurality of RATs;
   obtaining a neighbor cell list for the first RAT in response to determining that the mobile communication device is camped on the first RAT;
   checking the validity of each neighbor cell in the neighbor cell list; and
   adding each valid neighbor cell in the neighbor cell list to the exclude lists associated with each RAT in the plurality of RATs, excluding the first RAT.

17. The mobile communication device of claim 10, wherein the processor is further configured with processor-executable instructions to conduct the PLMN search for each RAT in the plurality of RATs utilizing the exclude lists associated with each RAT by:
   selecting a first RAT from the plurality of RATs;
   conducting the PLMN search for the first RAT, wherein the PLMN search excludes frequencies listed in the exclude list associated with the first RAT; and
   updating the exclude lists of each RAT in the plurality of RATs, excluding the first RAT, based on the PLMN search for the first RAT.

18. The mobile communication device of claim 17, wherein the processor is further configured with processor-executable instructions to update the exclude lists of each RAT in the plurality of RATs, excluding the first RAT, based on the PLMN search for the first RAT by:
   identifying a first frequency band utilized by the first RAT during the PLMN search; and
   adding the first frequency band to the exclude lists of each RAT in the plurality of RATs, excluding the first RAT.

19. A non-transitory computer readable storage medium having stored thereon processor-executable software instructions configured to cause a processor of a mobile communication device to perform operations comprising:
   profiling a frequency space to identify one or more frequency bands that may be utilized by one of a plurality of radio access technologies (RATs);
   determining, according to a priority ordering of the plurality of RATs, a RAT that utilizes each identified frequency band, wherein the priority ordering is based on a size of a frequency bandwidth of each RAT of the plurality of RATs;
   adding, for each RAT in the plurality of RATs, the identified frequency bands utilized by each RAT to exclude lists associated with other RATs in the plurality of RATs; and
   conducting a public land mobile network (PLMN) search for each RAT in the plurality of RATs utilizing the exclude lists associated with each RAT.

20. The non-transitory computer readable storage medium of claim 19, wherein the stored processor-executable software instructions are configured to cause a processor of the mobile communication device to perform operations such that profiling the frequency space comprises:
   obtaining, for a plurality of narrow frequency bands in the frequency space, received signal strength values; and
   identifying the one or more frequency bands, wherein each identified frequency band comprises a plurality of consecutive narrow frequency bands with received signal strength values above a threshold.

21. The non-transitory computer readable storage medium of claim 19, wherein the stored processor-executable software instructions are configured to cause a processor of the mobile communication device to perform operations such that determining, according to the priority ordering of the plurality of RATs, a RAT that utilizes each identified frequency band comprises:
   selecting a RAT in the plurality of RATs according to the priority ordering; and
   verifying whether each of the identified frequency bands carry a signal for the selected RAT.

22. The non-transitory computer readable storage medium of claim 19, wherein the priority ordering orders the plurality of RATs from largest frequency bandwidth to smallest frequency bandwidth.

23. The non-transitory computer readable storage medium of claim 19, wherein the stored processor-executable software instructions are configured to cause the processor of the mobile communication device to perform operations further comprising adding information from neighbor cell lists to the exclude lists associated with each RAT in the plurality of RATs.

24. The non-transitory computer readable storage medium of claim 23, wherein the stored processor-executable software instructions are configured to cause a processor of the mobile communication device to perform operations such that adding information from neighbor cell lists to the exclude lists associated with each RAT in the plurality of RATs comprises:
   determining whether the mobile communication device is camped on a first RAT in the plurality of RATs;
   obtaining a neighbor cell list for the first RAT in response to determining that the mobile communication device is camped on the first RAT;
   checking the validity of each neighbor cell in the neighbor cell list; and
   adding each valid neighbor cell in the neighbor cell list to the exclude lists associated with each RAT in the plurality of RATs, excluding the first RAT.

25. The non-transitory computer readable storage medium of claim 19, wherein the stored processor-executable software instructions are configured to cause a processor of the mobile communication device to perform operations such that conducting the PLMN search for each RAT in the plurality of RATs utilizing the exclude lists associated with each RAT comprises:

selecting a first RAT from the plurality of RATs;

conducting the PLMN search for the first RAT, wherein the PLMN search excludes frequencies listed in the exclude list associated with the first RAT; and updating the exclude lists of each RAT in the plurality of RATs, excluding the first RAT, based on the PLMN search for the first RAT.

26. The non-transitory computer readable storage medium of claim 25, wherein the stored processor-executable software instructions are configured to cause a processor of the mobile communication device to perform operations such that updating the exclude lists of each RAT in the plurality of RATs, excluding the first RAT, based on the PLMN search for the first RAT comprises:

identifying a first frequency band utilized by the first RAT during the PLMN search; and adding the first frequency band to the exclude lists of each RAT in the plurality of RATs, excluding the first RAT.

27. A mobile communication device, comprising:

means for profiling a frequency space to identify one or more frequency bands that may be utilized by one of a plurality of radio access technologies (RATs);

means for determining, according to a priority ordering of the plurality of RATs, a RAT that utilizes each identified frequency band, wherein the priority ordering is based on a size of a frequency bandwidth of each RAT of the plurality of RATs;

means for adding, for each RAT in the plurality of RATs, the identified frequency bands utilized by each RAT to exclude lists associated with other RATs in the plurality of RATs; and means for conducting a public land mobile network (PLMN) search for each RAT in the plurality of RATs utilizing the exclude lists associated with each RAT.

* * * * *